United States Patent Office 3,639,570
Patented Feb. 1, 1972

3,639,570
ORAL HYGIENE WITH AMINOPOLYUREYLENE RESIN
Paul Sheldon Grand, South Bound Brook, and Joseph Gerald Becker, Martinsville, N.J., assignors to Colgate-Palmolive Company, New York, N.Y.
No Drawing. Filed Nov. 16, 1970, Ser. No. 90,134
Int. Cl. A61k 7/16
U.S. Cl. 424—54                         10 Claims

ABSTRACT OF THE DISCLOSURE

A method of improving oral hygiene by inhibiting growth of streptococci and inhibiting formation of calculus and caries comprising intermittently contacting the oral cavity with a composition comprising an effective amount of an aminopolyureylene resin having a molecular weight in the range of about 300 to 100,000 in a compatible, nontoxic carrier and compositions for use in the method.

---

The present invention relates to a method of improving oral hygiene by inhibiting growth of streptococci found in the oral cavity and by inhibiting formation of calculus and caries. More particularly, the method consists of intermittently contacting the oral cavity with an effective amount of an aminopolyureylene (APU) resin in a compatible, nontoxic carrier. The invention also includes dental compositions comprising the APU resin in the compatible, nontoxic carrier. Such compositions may take the form of a dentifrice paste or powder, a mouthwash, a tablet, a lozenge, gum or the like depending upon the nature and form of the compatible, nontoxic carrier.

The essential component in the oral hygiene method and composition is an aminopolyureylene resin characterized by the following repeating unit:

$$\{(CH_2)_n-X-(CH_2)_n NHC(Y)NH\}$$

wherein X is NH, N—$C_1$–$C_{22}$ alkyl,

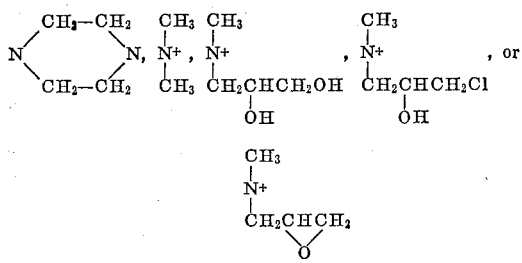

Y is O or S, and $n$ is 2 or 3.

Thus, suitable APU resins include both the polyurea- and the polythiourea-containing compounds. Preferred APU resins have a repeating unit where Y is oxygen, $n$ is 3, and X is selected from the group consisting of N—$C_{1-8}$ alkyl and

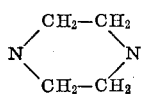

Generally, the number of repeating units in the resin will be sufficient to yield a polymer having a molecular weight in the range of about 300 to 100,000. Preferred APU resins have an average molecular weight in the range of 1000 to 20,000; and a particularly preferred resin is the reaction product of equimolar amounts of N-methyl-bis (3-aminopropyl) amine and urea having a molecular weight of about 4300.

The molecular weight of the APU resins is based upon aqueous gel permeation chromatographic analysis. The separation is carried out in oxalic acid solution, adjusted to pH 3.5, on three Corning controlled-pore glass columns (nominal pore sizes 175, 125 and 75 A.) in series. Detection is by differential refractometer. Reference compounds are dextran polysaccharides of molecular weights of 150,000, 110,000, 40,000, 20,000 and 10,000 and sucrose and galactose.

The APU resins which can be used in the compositions of this invention are prepared by reacting, for example. 145 grams of N-methyl-bis(3-aminopropyl) amine (1.0 mole) and 60 grams of urea (1.0 mole) in a 3-necked flask equipped with a thermometer, mechanical stirrer, condenser, and nitrogen sparge tube. Nitrogen is bubbled slowly through the solution throughout the course of the reaction. The solution is heated to 140° C. over a 20-minute interval where ammonia begins to evolve. The solution is further heated to 250° C. over a 30-minute interval and allowed to cool. The product is a hard, resinous powder (Resin A) having a molecular weight of about 4300. The secondary amine analogues can be made by the above process if bis(3-aminopropyl) amine or bis (2-amino-ethyl) amine are reacted with urea or thiourea. The piperazine analogues are made by reacting N,N'-di (2-aminopropyl) piperazine or N,N-di(2-aminoethyl) piperazine with urea or thiourea. The N—$C_1$ to $C_{22}$ alkyl analogues are prepared by reacting N—$C_1$ to $C_{22}$ alkyl-bis (3-aminopropyl) amine or N—$C_1$ to $C_{22}$ alkyl-bis (2-amino-ethyl) amine with urea or thiourea. Additional analogues are prepared by the following reactions:

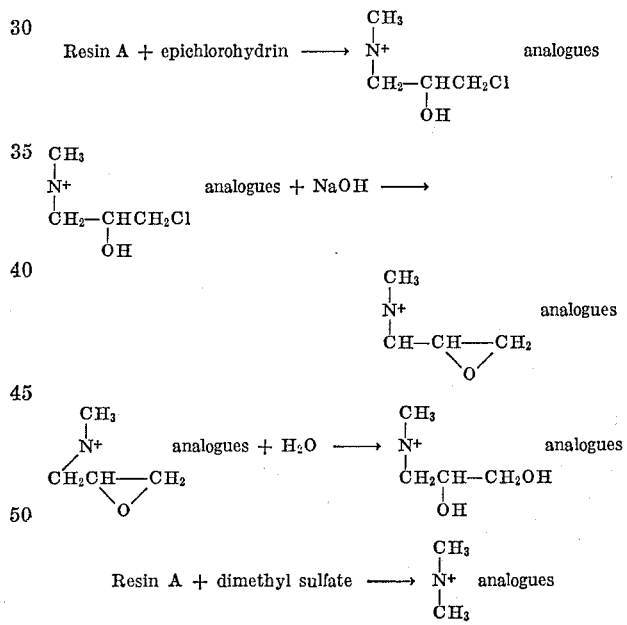

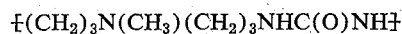

The preparation of the remaining analogues is well within the skill of the art following the above techniques.

The antimicrobial effectiveness of the APU resins was determined using the "Test Tube Serial Dilution Method" described on pages 195–200 of the fifth edition of "Diagnostic Bacteriology" by Schaub et al. Table I sets forth the "minimum inhibitory concentration" (MIC) against Streptococcus A and Streptococcus B, two predominant microorganisms isolated from the saliva of a human who is subject to calculus formation and caries formation, of an APU resin (Resin A) having an average molecular weight of about 4300 and a repeating unit $$\{(CH_2)_3 N(CH_3)(CH_2)_3 NHC(O)NH\}$$

The test composition was a 0.5% solution of Resin A in an aqueous alcoholic medium containing 50% by weight of ethanol. Test results are shown in Table I.

TABLE I

| Microorganism: | MIC in micrograms per milliliter (μg./ml.) |
|---|---|
| Streptococcus A | 12.8 |
| Streptococcus B | 6.4 |

The foregoing results illustrate the highly desirable, unexpected antimicrobial properties of APU resins orally. The antimicrobial properties of APU resins in this test are equivalent to the results obtained with chlorothymol, an effective antimicrobial compound, against the same microorganisms.

In addition to antimicrobial effectiveness, the APU resins also are effective in inhibiting formation of calculus and caries in the oral cavity. More specifically the APU resins are effective in countering oral calculus in its formative stages.

The calculus-inhibiting properties of the APU resins are demonstrated using an in vitro test wherein artifical calculus deposits are formed. More particularly, when two sterilized glass slides (1.3 cm. width and 7.6 cm. length) are incubated for 24 hours at 37° C. in 5 milliliters of a solution containing a 1% concentration of Zipkin-McClure diet (66.5% cornstarch, 27% whole milk powder, 5% whole dried yeast, 0.5% of a salt mixture containing .449% sodium chloride, .048% ferric citrate trihydrate and .0035% copper sulfate and 1% cod liver oil) and two drops (0.1 ml.) of pooled, paraffin-stimulated human saliva, deposits form on the glass slide which are similar to oral calculus deposits in composition as they consist primarily of calcium phosphate. Saliva is generated by having a group of people chew paraffin wax and pooling the saliva of the group.

The foregoing test provides a convenient means for evaluating calculus-inhibiting properties of various compounds by including 1 milliliter of a specific concentration (0.1 to 1.0% by weight) of a known compound in the incubated solution and thereafter observing the incubated slides and comparing them with slides incubated in the absence of the test compound. Slides are scored according to the following scale:

+ = deposit occurs
0 = no deposit
s = slight deposit as compared with the control deposit When a 0.1% solution of Resin A in water was tested in the foregoing test, no deposit was observed on the slide, thereby indicating small concentrations of APU resin are effective to inhibit formation of calculus in the oral cavity. Again, by way of comparison, the performance of APU resin in this test was equivalent to that of 0.1% chlorothymol, a particularly effective anti-calculus agent; whereas 0.1% heptyl p-hydroxy benzoate, 1.0% hexamethyl phosphoramide, 0.1% cationic dimethyl polysiloxane and 0.1% of a cationic polymer ("Reten 205MH") were ineffective in the same test.

The $LD_{50}$ of Resin A has been determined to be 1500 milligrams per kilogram, indicating the aminopolyureylene resins are nontoxic. Accordingly, these materials are safe for use and formulation in any composition designed for application to the oral cavity provided that such carrier compositions do not contain any ingredients which are toxic or would inactivate the APU polymer. Such oral compositions include toothpaste, tooth powder, mouthwash, dental tablets, lozenges, dental floss and chewing gum. In general, the concentration of APU resin in such compositions will be an amount selected from the range of about .05% to about 3.0% by weight and effective to inhibit growth of oral streptococcal microorganisms and to inhibit formation of calculus.

In the preparation of dentifrice compositions in the form of a paste, powder or tablet, a dentally acceptable water-insoluble polishing agent is usually the major ingredient and is present in amounts from about 20% to 95% by weight. Usual weight concentrations are 70% to 95% in tooth powders and 20% to 75% in tablets and toothpaste or cream. Representative polishing agents include, for example, dicalcium phosphate, tricalcium phosphate, insoluble sodium metaphosphate, aluminum hydroxide, magnesium carbonate, hydrated silica, calcium sulfate, bentonite, etc., including suitable mixtures thereof. It is preferred to use the water-insoluble calcium or magnesium salts as the polishing agents and, more particularly, calcium carbonate and/or a calcium phosphate, such as dicalcium phosphate dihydrate. In addition to the polishing agent, the dentifrice compositions in powder, tablet and paste form may include from 1% to 3% by weight of a nonionic, cationic or anionic detergent, preferably sodium N-lauroyl sarcosinate, and a sufficient amount of a fluoride containing compound such as

$Na_2FPO_3$, NaF or $SnF_2$ to provide from .05% to .15%, preferably 0.1%, of fluoride ion in the final product.

In dental cream compositions the polishing agent, APU resin and optional ingredients are proportioned in a liquid medium comprising water and a humectant such as glycerine, propylene glycol or sorbitol. The liquid medium amounts to 20% to 75% by weight of the cream. The humectant amounts to 15% to 40% by weight of the dental cream. Such creams preferably include from 0.5% to 10% by weight of a gelling agent such as natural and synthetic gums and gum-like materials, e.g., Irish moss, gum tragacanth, sodium carboxymethylcellulose, polyvinylpyrrolidone, starch and the like.

In addition to the APU resin, polishing agent and optional ingredients discussed above, tablet compositions generally include from 30% to 50% by weight of mannitol, starch or lactose, 2% to 10% by weight of a polyethylene glycol (M.W. of 3000 to 10,000) or polyvinyl pyrrolidone binder and 1% to 2% by weight of a die lubricant such as magnesium stearate, magnesium silicate, sodium benzoate, talc and the like.

Mouth washes or rinses are also within the scope of the claimed invention. Such products generally contain an effective amount of APU resin selected from the range of about .05% to 3.0% by weight in a suitably flavored aqueous alcoholic medium containing from about 4% to 70%, preferably 5% to 40%, by weight of a $C_2$-$C_3$ alkanol such as ethanol.

Suitable liquid dentifrices are similar to the mouth washes, but also contain minor proportions of 0.5% to 3.0% by weight of a surface active material and from 0 to 30% by weight of a polishing agent such as a particulate aluminum hydroxide. When a polishing agent is present, the liquid will also contain from 2% to 5% by weight of a gelling agent such as sodium carboxymethylcellulose or an alginate.

In the case of chewing gum, an effective amount of APU resin chosen from the range of .05% to 3% by weight is incorporated in one of the usual gum bases. For example, the resin can be incorporated in a warm gum base with stirring to distribute the same uniformly therein. It can also be added to the exterior or outer surfaces of a gum base in order to coat the base. The usual gum base can be used, representative materials being jelutong, rubber latex, Vinylite resins, etc., in addition to other usual materials such as plasticizers or softeners, sugar or other suitable carbohydrates such as glucose, sorbitol, etc.

Various adjuvant materials can be incorporated in the above-identified dental preparation, provided they do not substantially adversely affect the properties and characteristics thereof. Such materials may be used as soluble saccharin, flavoring oils (e.g., oils of spearmint, peppermint, wintergreen), coloring or whitening agents (e.g., titanium dioxide), preservatives (e.g., sodium benzoate, etc.), alcohol, menthol, and the like. Various other materials can be added such as coloring agents and higher fatty acid amides of amino carboxylic acid compounds, e.g., sodium lauroyl and palmitoyl sarcosides. Other suitable materials are chlorophyllin and various ammoniated ingredients, such as urea, diammonium phosphate and mixtures thereof. Such materials are each usually present in minor amounts of from 0.01% to 3% by weight of the dental preparation.

EXAMPLE 1

A toothpaste is formed in the normal manner and an aminopolyureylene resin is incorporated therein to provide the following compositions:

|  | Percent by weight |
|---|---|
| Resin A | 0.50, 1.0 and 1.5 |
| Sodium benzoate | 0.15 |
| Saccharine | 0.20 |
| Sodium N-lauroyl sarcosinate | 2.00 |
| Insoluble sodium metaphosphate | 40.60 |
| Dicalcium phosphate | 4.24 |
| Titanium dioxide | 0.40 |
| $Na_2FPO_3$ | 0.76 |
| Gum tragacanth | 1.40 |
| Glycerine (99.3%) | 27.10 |
| Water, color, flavoring | Balance |
|  | 100.00 |

The foregoing toothpastes are viscous, opaque creams and are effective in improving oral hygiene when used in the usual manner. They are particularly useful in inhibiting calculus formation.

EXAMPLE 2

When an aminopolyureylene resin having an average molecular weight of about 5700 and containing the repeating unit

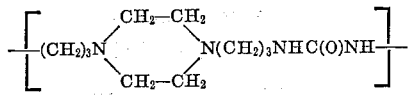

is substituted for Resin A in the compositions of Example 1, similar results may be obtained.

EXAMPLE 3

A typical chewable dental tablet which is effective against Streptococci A and B and to inhibit calculus formation has the following composition.

|  | Percent by weight |
|---|---|
| Insoluble sodium metaphosphate | 31.69 |
| Talc | 0.50 |
| Dicalcium phosphate (anhydrous) | 4.03 |
| Mannitol | 47.30 |
| Starch | 3.00 |
| Carboxymethylcellulose (7 M.P.) | 1.25 |
| Sodium N-lauroyl sarcosinate | 2.25 |
| Polyethylene glycol (mol. wt. about 6000) | 5.00 |
| Saccharine | 0.25 |
| Magnesium stearate | 1.25 |
| Resin A | 1.0 |
| Flavoring, coloring | 2.48 |
|  | 100.00 |

EXAMPLE 4

A mouth rinse having the following composition is formed in the usual manner and exhibits the following composition.

|  |  |
|---|---|
| Resin A | 2.5 |
| Ethanol | 10.0 |
| Polyoxyethylene (20) sorbitan monolaurate (Tween 20) | 0.4 |
| Sodium benzoate | 0.5 |
| Sodium saccharinate | 0.065 |
| Color | 0.32 |
| Flavor | 0.20 |
| Water | Balance |
|  | 100.00 |

This mouth rinse is effective in inhibiting calculus formation.

When resins having an average molecular weight in the range of 1000 to 20,000 and a unit repeating of

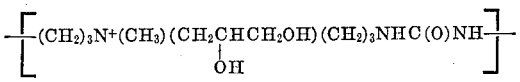

or

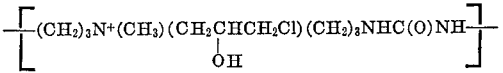

or

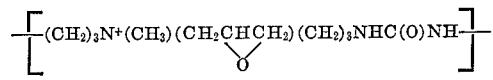

is substituted for the Resin A in the compositions of Examples 1, 3 and 4 substantially similar results are obtained.

EXAMPLE 5

The caries-inhibiting properties of the aminopolyureylene resin containing compositions are shown in the following in vivo test. Caries-susceptible, litter-mated hamsters bred either from the Keyes strain or the NIDR (National Institute for Dental Research) strain in groups of 15 males and 15 female per control group and per each test group were fed a Mitchell cariogenic diet and received constant deionized water. Each day each hamster's teeth were swabbed 30 seconds by cotton tipped swabs, the control group with water and each test group with a test solution comprising 0.1% by weight of Resin A in deionized water. After six weeks of swabbing the animals were sacrified, and the defleshed heads were scored by a modified version of the Keyes scoring method. Mean averages and percentage changes from the control were determined and tested statistically to determine the significance.

| Males | 36.46 |
|---|---|
| Females | 14.31 |
| Mean average | 29.17 |

The results set forth above indicate the significant effectiveness of the aminopolyureylene resins of the invention in reducing caries formation. Thus, these resins are effective to improve oral hygiene by inhibiting calculus and caries formation in the oral cavity as well as inhibiting growth of Streptococci therein.

The APU resins are also effective in combination with other caries-inhibiting agents of the thiocarbamate type having the formula $RN^+(CH_3)_2(CH_2)_nOCSN(R_1)_2$ wherein R is an alkyl group of 10 to 18 carbon atoms, $n$ is an integer from 1-4 and $R_1$ is selected from the group consisting of H and $C_1$-$C_3$ alkyl. The proportion of the thiocarbamate in the dental preparation is generally from .05% to 5%, preferably 0.1% to 1.0%, by weight.

Generally, the compositions comprising an effective amount of aminopolyureylene resin are intermittently contacted with the oral cavity, e.g., by brushing or swabbing the teeth or rinsing said cavity daily to promote oral hygiene.

Although the present invention has been described with reference to particular embodiments and examples, it will be apparent to those skilled in the art that variations and modifications of this invention can be made and that equivalents can be substituted therefor without departing from the principles and spirit of the invention.

We claim:

1. A method of improving oral hygiene by inhibiting the growth of Streptococci and inhibiting formation of calculus and caries which comprises applying to the oral cavity an oral composition comprising an effective amount selected from the range of 0.05% to 3.0% by weight of an aminopolyureylene resin having a molecular weight of 300 to 100,000 and the following repeating unit $$-[(CH_2)_n(X)(CH_2)_nNHC(Y)\underline{N}H]-$$

wherein X is NH, N—$C_1$–$C_{22}$ alkyl

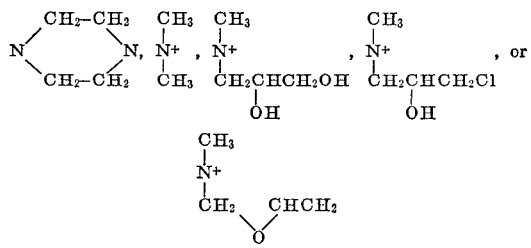

Y is O or S, and $n$ is 2 or 3 and a compatible, nontoxic carrier.

2. A method as claimed in claim 1 wherein said resin has an average molecular weight in the range of 1000 to 20,000 and said repeating unit is $$-[(CH_2)_n(X)(CH_2)_nNHC(O)\underline{N}H]-$$

wherein X is selected from the group consisting of

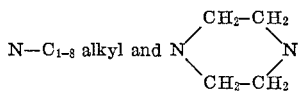

3. A method as claimed in claim 2 wherein said repeating unit is $$-[(CH_2)_3N(CH_3)(CH_2)_3NHC(O)\underline{N}H]-$$

4. A dental preparation comprising an effective amount selected from the range of 0.05% to 3.0% by weight of an aminopolyureylene resin having a molecular weight of 300 to 100,000 and the following repeating unit $$-[(CH_2)_n(X)(CH_2)_nNHC(Y)\underline{N}H]-$$

wherein X is NH, $NC_1$–$C_{22}$ alkyl,

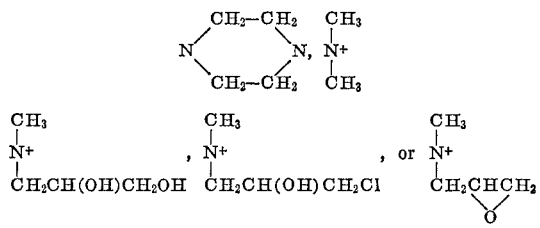

and a compatible, non-toxic carrier, said preparation being effective to improve oral hygiene by inhibiting growth of oral Streptococci and inhibiting formation of calculus and caries.

5. A dental preparation as claimed in claim 4 which contains in addition of 0.05% to 5.0% by weight of the preparation of a caries inhibiting thiocarbamate having the formula $$RN^+(CH_3)_2(CH_2)_nOCSN(R_1)_2$$

wherein R is an alkyl group of 10 to 18 carbon atoms, $n$ is an integer from 1 to 4 and $R_1$ is hydrogen or $C_1$–$C_3$ alkyl.

6. A dental preparation as claimed in claim 4 wherein said resin has an average molecular weight in the range of 1000 to 20,000 and Y is O.

7. A dental preparation as claimed in claim 6 wherein said carrier comprises a flavored, aqueous alcoholic vehicle containing 4% to 70% of a $C_2$–$C_3$ alkanol based on the weight of the preparation, said preparation being in the form of a mouth wash.

8. A dental preparation as claimed in claim 6 wherein said repeating unit of said resin is $$-[(CH_2)_3N(CH_3)(CH_2)_3NHC(O)\underline{N}H]-$$

9. A dental preparation as claimed in claim 6 wherein said carrier comprises from 20% to 95% by weight of the preparation of a dentally acceptable water-insoluble polishing agent.

10. A dental preparation as claimed in claim 9 wherein said carrier comprises by weight of the preparation 20% to 75% of said polishing agent, 15% to 40% of glycerine, propylene glycol or sorbitol humectant, 0.5% to 10% of a gelling agent and water, said preparation being in the form of a dental cream.

No references cited.

RICHARD L. HUFF, Primary Examiner

U.S. Cl. X.R.

424—78